United States Patent
Chiu et al.

(10) Patent No.: US 8,111,030 B2
(45) Date of Patent: Feb. 7, 2012

(54) MOTOR CONTROL APPARATUS AND MOTOR CONTROL METHOD

(75) Inventors: Chun-Lung Chiu, Taoyuan Hsien (TW); Ming-Shi Tsai, Taoyuan Hsien (TW); Po-Tsun Kuo, Taoyuan Hsien (TW); Chung-Hung Tang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 712 days.

(21) Appl. No.: 12/241,982

(22) Filed: Sep. 30, 2008

(65) Prior Publication Data

US 2009/0289585 A1    Nov. 26, 2009

(30) Foreign Application Priority Data

May 23, 2008  (TW) ................................ 97119026 A

(51) Int. Cl.
G05B 11/28  (2006.01)

(52) U.S. Cl. ......... 318/599; 318/811; 318/779; 318/799

(58) Field of Classification Search .................. 318/727, 318/599, 811, 799, 779, 400.01, 721; 417/22, 417/42, 44.1
See application file for complete search history.

(56) References Cited

U.S. PATENT DOCUMENTS

| | | | | |
|---|---|---|---|---|
| 6,392,372 B1 * | 5/2002 | Mays, II | .................. | 318/400.01 |
| 6,885,160 B2 * | 4/2005 | Takeuchi | ....................... | 318/139 |
| 7,138,781 B2 * | 11/2006 | Murray et al. | ........... | 318/400.04 |
| 7,564,204 B2 * | 7/2009 | Ogino et al. | ............. | 318/400.01 |
| 7,590,334 B2 * | 9/2009 | Yabusaki et al. | ............... | 388/811 |
| 2005/0161022 A1 * | 7/2005 | Kishi et al. | ..................... | 123/353 |

* cited by examiner

*Primary Examiner* — Walter Benson
*Assistant Examiner* — Antony M Paul
(74) *Attorney, Agent, or Firm* — Muncy, Geissler, Olds & Lowe, PLLC

(57) ABSTRACT

A motor control apparatus and a motor control method determine whether the motor is in a back-pressure area so as to provide different rotation-speed control signals. When the fan is in the low duty cycle, a first circuit loop is switched on, so that the fan has more accurate rotation speed. When the fan is in the high duty cycle, a second circuit loop is switched on, so that the rotation speed of fan does not be limited to a constant rotation-speed as the fan enters the back-pressure area. Thus, the fan has larger airflow quantity and higher airflow pressure.

10 Claims, 3 Drawing Sheets

US 8,111,030 B2

MOTOR CONTROL APPARATUS AND MOTOR CONTROL METHOD

CROSS REFERENCE TO RELATED APPLICATIONS

This Non-provisional application claims priority under 35 U.S.C. §119(a) on Patent Application No(s). 097119026, filed in Taiwan, Republic of China on May 23, 2008, the entire contents of which are hereby incorporated by reference.

BACKGROUND OF THE INVENTION

1. Field of Invention

The present invention relates to a motor control apparatus and a motor control method. More particularly, the present invention relates to a motor control apparatus and a motor control method that can determine whether the motor is in a back pressure area so as to provide different rotation-speed control signals, thereby increasing the efficiency of the motor.

2. Related Art

The motor control technology has been developed for a long time. For example, the circuit can be applied to the motor for controlling the rotation of the motor. Moreover, the circuit can further be used to adjust the rotation speed of the motor. As shown in FIG. 1, a conventional motor control apparatus 1A mainly includes a driver circuit 10 and a coil switching circuit 12, which form an open-loop control circuit. The driver circuit 10 is used to drive the motor 22 to rotate, and controls the close/open of the coil switch circuit 14 according to a duty cycle of a pulse width modulation signal T. Accordingly, the current direction of the coil set 21 of the motor 2 can be switched between two adjacent phases so as to adjust and control the rotation speed of the motor 2. As shown in FIG. 2, another conventional motor control apparatus 1B mainly includes a driver circuit 10, a coil switching circuit 12 and a rotation-speed detecting circuit 14, which form a close-loop control circuit. The configuration of the rotation-speed detecting circuit 14 can allow the motor have a duty cycle ($T_S$) switch at full speed. The duty cycle ($T_S$) and the rotation-speed detecting circuit 14 have a corresponding function. That is, the duty cycle ($T_S$) can be changed according to the detecting of the rotation-speed detecting circuit 14. When the detected rotation speed increases, the duty cycle ($T_S$) also increase until reaching 100%. Thus, after adding the rotation-speed detecting circuit 14, the rotation speed of the motor 2 can be increased after the motor 2 enters the back-pressure area, thereby achieving the effect of increasing airflow quantity and airflow pressure.

Regarding to the open-loop control circuit of FIG. 1, since the rotation speed is controlled by the pulse width modulation signal T when the fan enters the back-pressure area (high duty cycle and high rotation speed), the effect of the airflow pressure and airflow quantity (PQ value) will be affected. Regarding to the close-loop control circuit of FIG. 2, the rotation speed of the motor 2 is affected by the rotation-speed detecting circuit 14 and thus be adjusted when the fan is in the low duty cycle (low rotation speed), so that the fan can not have accurate rotation speed.

SUMMARY OF THE INVENTION

In view of the foregoing, the present invention is to provide a motor control apparatus and a motor control method that can determine whether the motor is in the back-pressure area so as to provide different rotation-speed control signals. For example, when the fan is in the low duty cycle (low rotation speed), a first circuit loop is switched on, so that the fan can have more accurate rotation speed. When the fan is in the high duty cycle, a second circuit loop is switched on, so that the rotation speed of the fan does not be limited as the fan enters the back-pressure area. Thus, the fan can have larger airflow quantity and higher airflow pressure. Accordingly, the motor control apparatus and method of the present invention can make the motor have optimum efficiency no matter whether the fan is in the back-pressure area or not.

To achieve the above, the present invention discloses a motor control apparatus, which is electrically connected to a motor and receives a first rotation-speed control signal. The motor control apparatus includes a phase switching unit, a sensing unit, a judging unit, a rotation-speed weighting unit, and a rotation-speed control unit. The phase switching unit is electrically connected to the motor for controlling a coil set of the motor to generate magnetization so as to drive a rotor of the motor to rotate. The sensing unit detects the coil set of the motor to retrieve a rotation-speed sensing signal and then outputs the rotation-speed sensing signal. The judging unit is electrically connected to the sensing unit and has a preset duty cycle value. The judging unit receives the first rotation-speed control signal and the rotation-speed sensing signal, and then compares the first rotation-speed control signal and the preset duty cycle value so as to decide to switch on a first circuit loop or a second circuit loop. The rotation-speed weighting unit is electrically connected to the judging unit. When the second circuit loop is switched on, the rotation-speed weighting unit operates. The rotation-speed weighting unit operates to retrieve the first rotation-speed control signal and the rotation-speed sensing signal from the judging unit and generates a second rotation-speed control signal after calculation. The rotation-speed control unit is electrically connected to the judging unit, the sensing unit, the rotation-speed weighting unit and the phase switching unit. When the first circuit loop is switched on, the rotation-speed control unit retrieves the first rotation-speed control signal from the judging unit and controls the phase switching unit according to the first rotation-speed control signal to drive the motor to generate magnetization so as to rotate the rotor. When the second circuit loop is switched on, the rotation-speed control unit retrieves the second rotation-speed control signal from the rotation-speed weighting unit and controls the phase switching unit according to the second rotation-speed control signal to drive the motor to generate magnetization so as to rotate the rotor of the motor.

Herein, the first circuit loop includes the judging unit, the rotation-speed control unit and the phase switching unit, and the second circuit loop includes the judging unit, the rotation-speed weighting unit, the rotation-speed control unit, the phase switching unit and the sensing unit.

In addition, the present invention also discloses a motor control apparatus being electrically connected to a motor and receiving a first rotation-speed control signal. The motor control apparatus includes a phase switching unit, a sensing unit and a speed control unit. The phase switching unit is electrically connected to the motor for controlling a coil set of the motor to generate magnetization so as to drive a rotor of the motor to rotate. The sensing unit detects the coil set of the motor to retrieve a rotation-speed sensing signal and then outputs the rotation-speed sensing signal. The speed control unit has a preset duty cycle value and is electrically connected to the sensing unit and the phase switching unit. The speed control unit respectively receives the first rotation-speed control signal and the rotation-speed sensing signal, and the speed control unit compares the first rotation-speed control signal and the preset duty cycle value. When the first rotation-speed control signal is lower than the preset duty cycle value, the rotation-speed control unit outputs the first rotation-speed control signal to the phase switching unit so as to control the motor. When the first rotation-speed control signal is higher than the preset duty cycle value, the rotation-speed control unit generates a second rotation-speed control signal after calculating the first rotation-speed control signal and the rotation-speed sensing signal, and then outputs the second rotation-speed control signal to the phase switching unit so as to control the motor.

To achieve the above, the present invention further discloses a motor control method including the following steps. First, a sensing unit is used to detect the signal generated by a phase switching unit of a motor control apparatus when the rotor of the motor is rotated so as to retrieve a rotation-speed sensing signal. Then, a first rotation-speed control signal is retrieved from an outside of a motor control apparatus. A judging unit or a speed control unit is used to compare the first rotation-speed control signal and a preset duty cycle value. When the first rotation-speed control signal is higher than the preset duty cycle value, a rotation-speed weighting unit or the rotation-speed control unit is used to generate a second rotation-speed control signal after calculating the first rotation-speed control signal and the rotation-speed sensing signal. The second rotation-speed control signal is then outputted to drive a motor to generate magnetization so as to rotate a rotor of the motor. Herein, the second rotation-speed control signal is the rotation speed of the rotor after entering a back-pressure area. In addition, when the first rotation-speed control signal is lower than the preset duty cycle value, the first rotation-speed control signal is outputted to drive the motor to generate magnetization so as to rotate the rotor of the motor.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
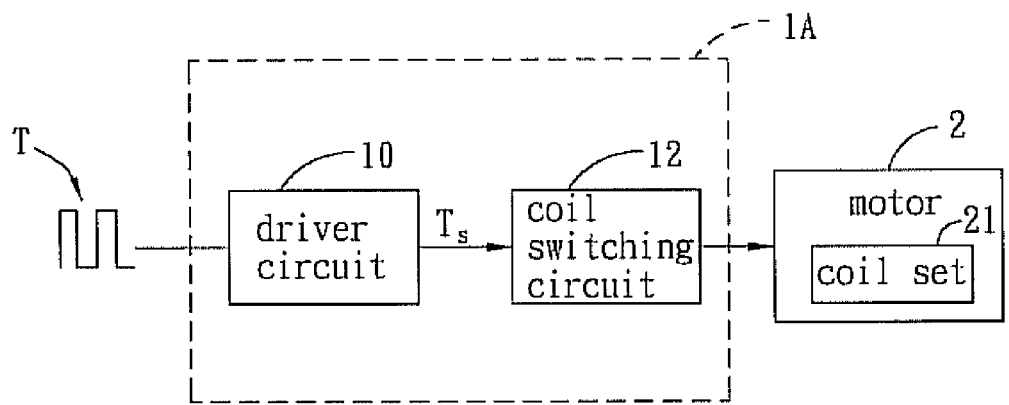
FIGS. 1 and 2 are circuit block diagrams showing two conventional motor control apparatuses and motors.
Figure 2:
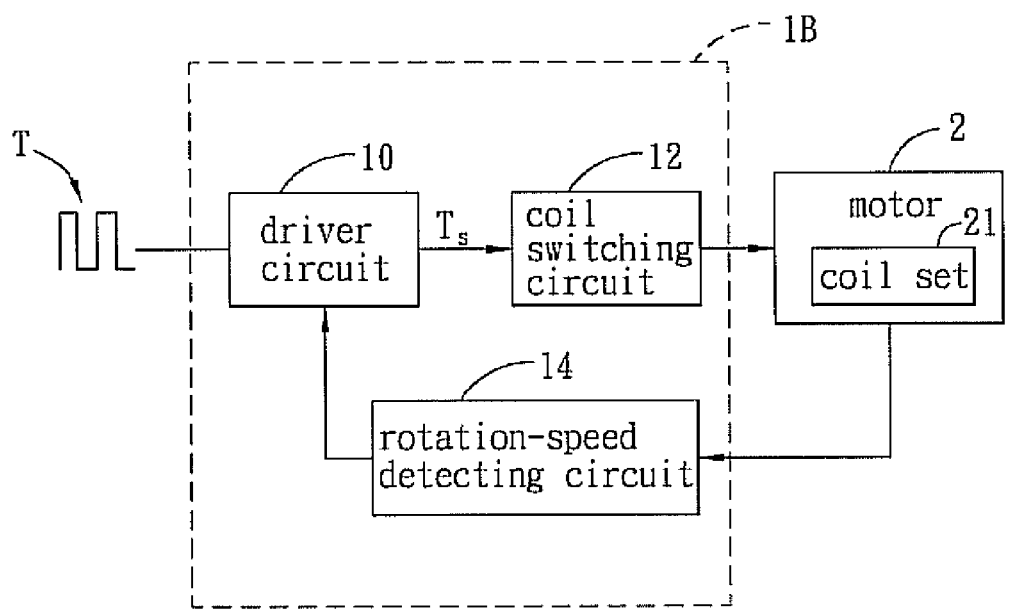
Figure 3:
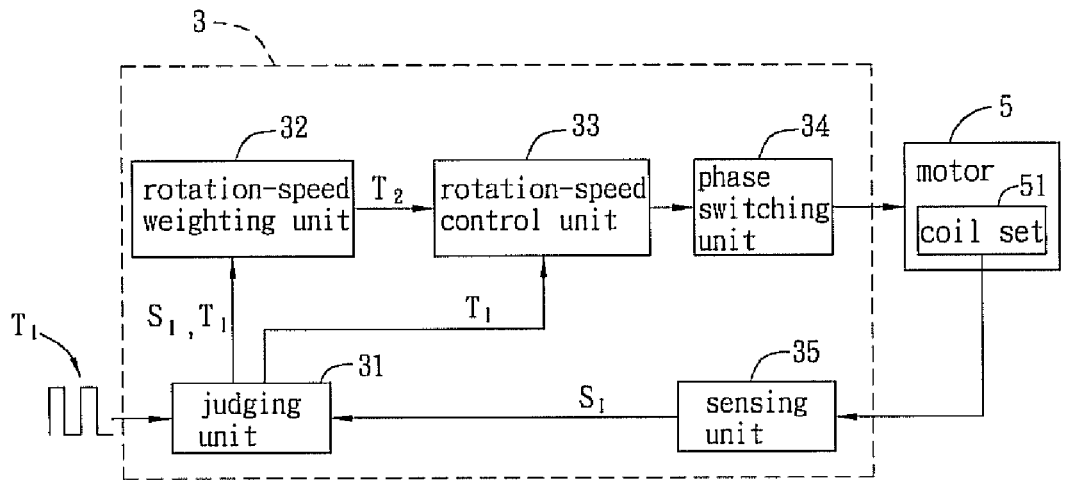
FIG. 3 is a circuit block diagram showing a motor control apparatus and a motor according to a first embodiment of the present invention.

FIG. 3 is a circuit block diagram showing a motor control apparatus 3 according to a first embodiment of the present invention. With reference to FIG. 3, the motor control apparatus 3 includes a judging unit 31, a rotation-speed weighting unit 32, a rotation-speed control unit 33, a phase switching unit 34 and a sensing unit 35. The judging unit 31, the rotation-speed control unit 33 and the phase switching unit 34 form a first circuit loop (an open loop). In addition, the judging unit 31, the rotation-speed weighting unit 32, the rotation-speed control unit 33, the phase switching unit 34 and the sensing unit 35 form a second circuit loop (a close loop). The motor control apparatus 3 can receive a first rotation-speed control signal $T_1$ from the outside of the motor control apparatus 3, and the first rotation-speed control signal $T_1$, such as a pulse width modulation signal, can be a duty cycle signal.

The phase switching unit 34 can be a full-bridge circuit or a half-bridge circuit. The phase switching unit 34 is electrically connected to the motor 5 for controlling a coil set 51 of the motor 5 to generate magnetization so as to drive a rotor of the motor 5 to rotate.

The sensing unit 35 is electrically connected to the judging unit 31 and detects the coil set 51 of the motor 5 to retrieve a rotation-speed sensing signal $S_1$, which is then outputted to the judging unit 31.

The judging unit 31, such as a comparator, has a preset duty cycle value ($T_X$) and is electrically connected to the rotation-speed weighting unit 32 and the rotation-speed control unit 33. The preset duty cycle value ($T_X$) can be a duty cycle threshold value of a fan while the fan is entering a back-pressure area. After the judging unit 31 receives the first rotation control signal $T_1$ from the outside of the motor control apparatus 3, the judging unit 31 compares the first rotation control signal $T_1$ and the preset duty cycle value ($T_X$). If the first rotation control signal $T_1$ is lower than the preset duty cycle value ($T_X$), the first circuit loop will be switched on to drive the motor 5 to rotate. In details, the first rotation control signal $T_1$ is transmitted to the rotation-speed control unit 33, and the rotation-speed control unit 33 controls the phase switching unit 34 according to the first rotation control signal $T_1$ to make the coil set 51 of the motor 5 perform phase switch. Thus, the motor 5 can be controlled to rotate. If the first rotation control signal $T_1$ is higher than the preset duty cycle value ($T_X$), the second circuit loop will be switched on to drive the motor 5 to rotate. In the embodiment, the rotation-speed control unit 33 is a driver IC.

The rotation-speed weighting unit 32 is electrically connected to the judging unit 31 and the rotation-speed control unit 33. When the judging unit 31 decides to switch on the second circuit loop to drive the motor 5 to rotate, the rotation-speed weighting unit 32 retrieves the first rotation-speed control signal $T_1$ and the rotation-speed sensing signal $S_1$ from the judging unit 31 and then generates a second rotation-speed control signal $T_2$ by calculation. The second rotation-speed control signal $T_2$ is transmitted to the rotation-speed control unit 33, and the rotation-speed control unit 33 controls the phase switching unit 34 according to the second rotation control signal $T_2$ to make the coil set 51 of the motor 5 perform phase switch. Thus, the motor 5 can be controlled to rotate. The second rotation-speed control signal $T_2$ can be a duty cycle signal, and it can be generated by the following equations:

$$T_2 = T_1 + S$$

$$S = (S_1/S_{Full}) * i \, k$$

wherein $S_{Full}$ is a full speed of the motor;
$S_1$ represents the rotation-speed sensing signal;
S is a weighted rotation speed;
$T_1$ represents the first rotation-speed control signal;
$T_2$ represents the second rotation-speed control signal; and
k is a constant.

Figure 4:
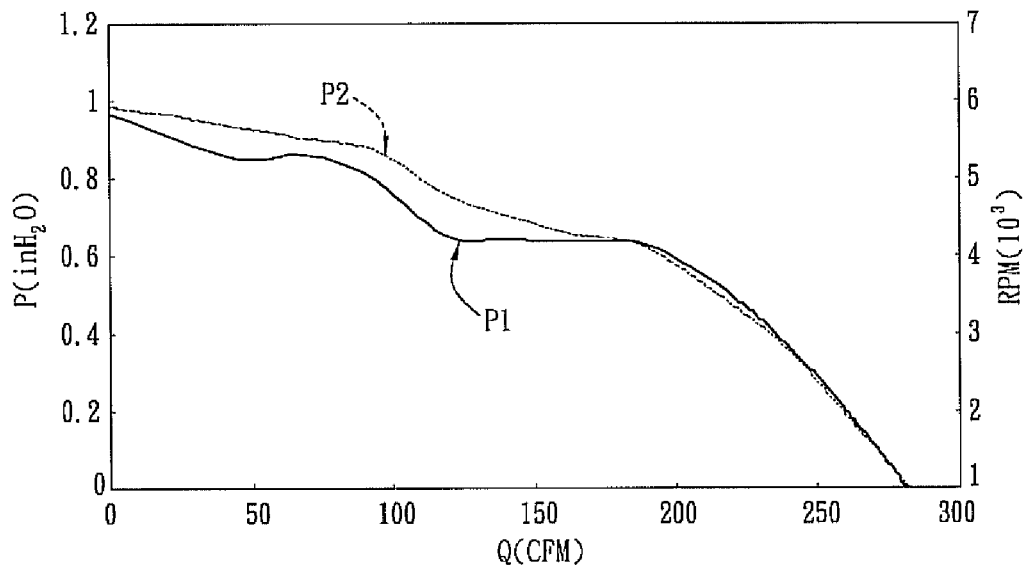
FIG. 4 is a schematic illustration showing the PQ curve of the motor control apparatus of the present invention.

As mentioned above, the present invention discloses a weighting function S corresponding to the rotation-speed sensing signal $S_1$ detected by the sensing unit 35. Thus, the motor 5 can have a duty cycle $T_2$ at the full speed, so that the rotation speed of the motor 5 can still be switched. According to the above-mentioned weighting functions, the rotation speed of the fan, after entering the back-pressure area, can reach much faster. As shown in FIG. 4, when the rotation speed of the motor 5 is between 4000 to 6000 rpm (high duty cycle or high rotation speed), the fan utilizing the motor 5 of the present invention can have higher air pressure and larger air quantity than that of the prior art (the PQ value of P2 is larger than the PQ value of P1). In addition, when the motor 5 operates at low rotation speed (not in the back-pressure area), the rotation speed of the motor 5 is controlled by the constant first rotation-speed control signal $T_1$. Thus, the motor 5 can have accurate rotation speed.

Figure 5:
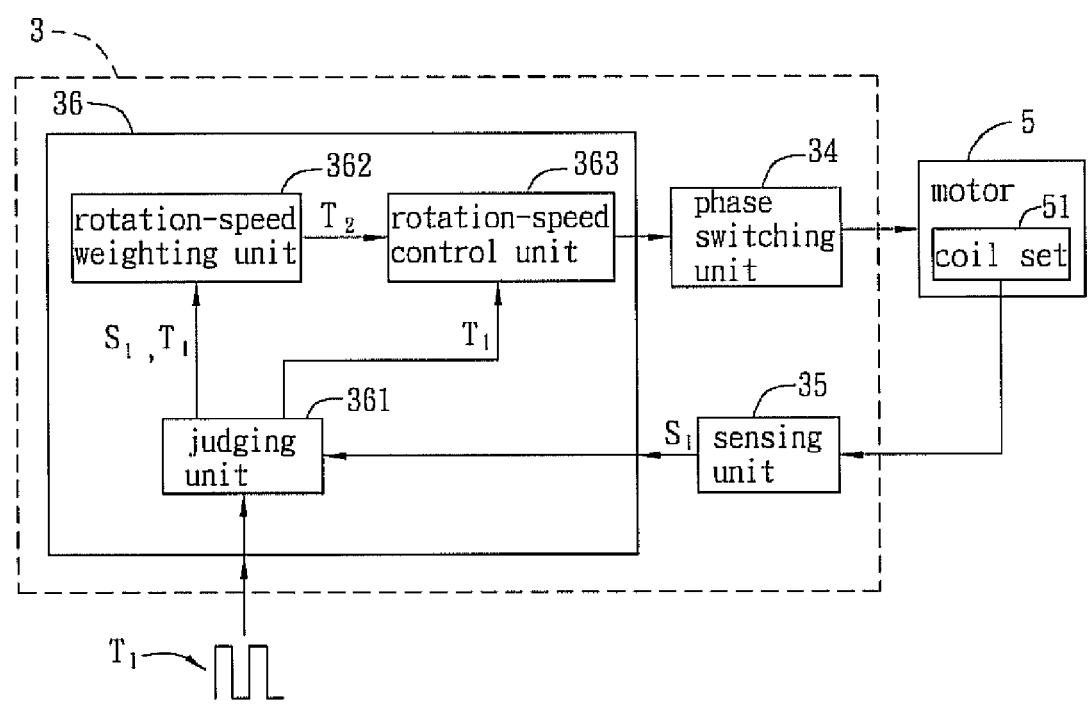
FIG. 5 is a circuit block diagram showing a motor control apparatus and a motor according to a second embodiment of the present invention.

FIG. 5 is a circuit block diagram showing a motor control apparatus 3 and the motor 5 according to a second embodiment of the present invention. In this embodiment, a rotation-speed control unit 363, a rotation-speed weighting unit 362 and a judging unit 361, which are similar to the rotation-speed control unit 33, the rotation-speed weighting unit 32 and the judging unit 31 of the first embodiment, are integrated in a speed control unit 36, such as a micro control unit (MCU). In addition, the phase switching unit 34 and the sensing unit 35 of the second embodiment are similar to those of the first embodiment, so the detailed description thereof will be omitted.

The speed control unit 36, which is electrically connected to the sensing unit 35 and the phase switching unit 34, has a preset duty cycle value $T_X$. The speed control unit 36 can receive a rotation-speed sensing signal $S_1$ from the sensing unit 35. First, after the speed control unit 36 receives the first rotation-speed control signal $T_1$ from the outside of the motor control apparatus 3, it will compare the first rotation-speed control signal $T_1$ and the preset duty cycle value $T_X$. When the first rotation-speed control signal $T_1$ is lower than the preset duty cycle value $T_X$, the speed control unit 36 outputs the first rotation speed control signal $T_1$ to the phase switching unit 34 so as to control the coil set 51 of the motor 5 to perform phase switch. Thus, the motor 5 can be controlled to rotate. When the first rotation-speed control signal $T_1$ is higher than the preset duty cycle value $T_X$, the speed control unit 36 generates a second rotation-speed control signal $T_2$ by calculating the first rotation-speed control signal $T_1$ and the rotation-speed sensing signal $S_1$. Then, the second rotation-speed control signal $T_2$ is outputted to the phase switching unit 34 so as to control the coil set 51 of the motor 5 to perform phase switch, thereby controlling the motor 5 to rotate.

In summary, the present invention determines whether the motor 5 is in the back-pressure area (high duty cycle and high rotation speed) so as to provide different rotation-speed control signals. For example, when the motor 5 is not in the back-pressure area, a first circuit loop is switched on, so that the fan can have more accurate rotation speed. When the motor 5 is in the back-pressure area, a second circuit loop is switched on, so that the rotation speed of fan does not be limited to the constant rotation-speed as the fan enters the back-pressure area. Thus, the fan can have larger airflow quantity and higher airflow pressure. Accordingly, the motor control apparatus and method of the present invention can make the motor 5 have optimum efficiency no matter whether the fan is in the back-pressure area or not.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control apparatus, electrically connected to a motor and receiving a first rotation-speed control signal, comprising:
    a phase switching unit electrically connected to the motor for controlling a coil set of the motor to generate magnetization so as to drive a rotor of the motor to rotate;
    a sensing unit detecting the coil set of the motor to retrieve a rotation-speed sensing signal and outputting the rotation-speed sensing signal;
    a judging unit electrically connected to the sensing unit and having a preset duty cycle value, wherein the judging unit receives the first rotation-speed control signal and the rotation-speed sensing signal, and the judging unit compares the first rotation-speed control signal and the preset duty cycle value so as to decide to switch on a first circuit loop or a second circuit loop;
    a rotation-speed weighting unit electrically connected to the judging unit and operating when the second circuit loop is switched on, wherein the rotation-speed weighting unit operates to retrieve the first rotation-speed control signal and the rotation-speed sensing signal from the judging unit and generates a second rotation-speed control signal after calculation; and
    a rotation-speed control unit electrically connected to the judging unit, the sensing unit, the rotation-speed weighting unit and the phase switching unit, wherein when the first circuit loop is switched on, the rotation-speed control unit retrieves the first rotation-speed control signal from the judging unit and controls the phase switching unit according to the first rotation-speed control signal to drive the motor to generate magnetization so as to rotate the rotor, and when the second circuit loop is switched on, the rotation-speed control unit retrieves the second rotation-speed control signal from the rotation-speed weighting unit and controls the phase switching unit according to the second rotation-speed control signal to drive the motor to generate magnetization so as to rotate the rotor;
    wherein the first circuit loop includes the judging unit, the rotation-speed control unit and the phase switching unit, and the second circuit loop includes the judging unit, the rotation-speed weighting unit, the rotation-speed control unit, the phase switching unit, and the sensing unit.

2. The motor control apparatus according to claim 1, wherein when the first rotation-speed control signal is lower than the preset duty cycle value, the first circuit loop is switched on, and when the first rotation-speed control signal is higher than the preset duty cycle value, the second circuit loop is switched on.

3. The motor control apparatus according to claim 1, wherein the preset duty cycle value is a duty cycle threshold value of a fan entering a back-pressure area.

4. The motor control apparatus according to claim 1, wherein the first rotation-speed control signal and the second rotation-speed control signal are both duty cycle signals.

5. The motor control apparatus according to claim 4, wherein when the first rotation-speed control signal is lower than the preset duty cycle value, the first circuit loop is switched on, and when the first rotation-speed control signal is higher than the preset duty cycle value, the second circuit loop is switched on.

6. The motor control apparatus according to claim 1, wherein the rotation-speed control unit, the rotation-speed weighting unit and the judging unit are integrated as a speed control unit.

7. The motor control apparatus according to claim 1, wherein the rotation-speed control unit is a micro control unit (MCU).

8. The motor control apparatus according to claim 1, wherein the first rotation-speed control signal is inputted from the outside of the motor control apparatus.

9. The motor control apparatus according to claim 1, wherein the phase switching unit is a full-bridge circuit or a half-bridge circuit, the judging unit is comparator, or the rotation-speed control unit is a driver IC.

10. The motor control apparatus according to claim 1, wherein the second rotation-speed control signal is a rotation speed signal of the rotor entering a back-pressure area, or the rotation-speed weighting unit generates the second rotation-speed control signal according to equations of:

$$T_2 = T_1 + S$$

$$S = (S_1/S_{Full}) * k$$

wherein
$S_{Full}$ is a full speed of the motor;
$S_1$ represents the rotation-speed sensing signal;
S is a weighted rotation speed;
$T_1$ represents the first rotation-speed control signal;
$T_2$ represents the second rotation-speed control signal; and
k is a constant.

* * * * *